US010271305B2

(12) United States Patent
Zhang et al.

(10) Patent No.: US 10,271,305 B2
(45) Date of Patent: Apr. 23, 2019

(54) TECHNIQUES FOR JOINT TRANSMISSION IN UNLICENSED SPECTRUM

(71) Applicant: QUALCOMM Incorporated, San Diego, CA (US)

(72) Inventors: Xiaoxia Zhang, San Diego, CA (US); Srinivas Yerramalli, San Diego, CA (US); Tao Luo, San Diego, CA (US)

(73) Assignee: QUALCOMM Incoporated, San Diego, CA (US)

( * ) Notice: Subject to any disclaimer, the term of this patent is extended or adjusted under 35 U.S.C. 154(b) by 253 days.

(21) Appl. No.: 15/222,731

(22) Filed: Jul. 28, 2016

(65) Prior Publication Data
US 2017/0034805 A1 Feb. 2, 2017

Related U.S. Application Data

(60) Provisional application No. 62/199,846, filed on Jul. 31, 2015.

(51) Int. Cl.
H04W 4/00 (2018.01)
H04W 72/00 (2009.01)
(Continued)

(52) U.S. Cl.
CPC ......... *H04W 72/005* (2013.01); *H04L 5/0035* (2013.01); *H04W 4/06* (2013.01);
(Continued)

(58) Field of Classification Search
CPC . H04W 72/005; H04W 74/002; H04W 48/08; H04W 4/06; H04W 74/08; H04W 16/14; H04W 84/042; H04L 5/0035
(Continued)

(56) References Cited

U.S. PATENT DOCUMENTS 9,042,288 B2 * 5/2015 Calcev .................. H04W 28/02
370/311
9,264,976 B2 2/2016 Khandekar et al.
(Continued)

FOREIGN PATENT DOCUMENTS

WO WO-2009/053941 A1 4/2009
WO WO-2009/064647 A1 5/2009

OTHER PUBLICATIONS

ETRI: "Design of Variable-Length Preamble for Modified LBE and Fine Frequency/Time", 3GPP Draft; R1-150647 Detailed Variable Length Preamble Design, 3rd Generation Partnership Project (3GPP), Mobile Competence Centre; 650, Route Des Lucioles; F-06921 Sophia-Antipolis Cedex; France, vol. RAN WG1, No. Athens, Greece; 20150209-20150213, Feb. 8, 2015 (Feb. 8, 2015), 5 Pages, XP050933849, Retrieved from the Internet: URL: http://www.3gpp.org/ftp/Meetings_3GPP_SYNC/RAN1/Docs/ [retrieved on Feb. 8, 2015] the whole document. (5 pages).
(Continued)

*Primary Examiner* — Chuong T Ho
(74) *Attorney, Agent, or Firm* — Dalei Dong; Arent Fox

(57) ABSTRACT

A method and apparatus for identifying joint transmissions in unlicensed spectrum are described, including receiving, at a user equipment (UE), a frame from one or more network entities over a contention-based medium, wherein the frame includes a preamble. The method and apparatus further include determining whether the frame corresponds to a unicast transmission or a joint transmission based on the preamble. In another aspect, a method and apparatus include determining, at a network entity, whether a frame corresponds to a unicast transmission or a joint transmission. The method and apparatus include transmitting the frame with a preamble to a UE over a contention-based medium, the preamble being based on determining whether the frame corresponds to the unicast transmission or the joint trans-
(Continued)

mission. For example, the type of scrambling applied to the preamble may be based on whether the frame corresponds to unicast transmission or joint transmission.

26 Claims, 12 Drawing Sheets

(51) Int. Cl.
  *H04W 4/06*    (2009.01)
  *H04L 5/00*    (2006.01)
  *H04W 74/08*    (2009.01)
  *H04W 16/14*    (2009.01)
  *H04W 48/08*    (2009.01)
  *H04W 74/00*    (2009.01)
  *H04W 84/04*    (2009.01)

(52) U.S. Cl.
  CPC .......... *H04W 16/14* (2013.01); *H04W 48/08* (2013.01); *H04W 74/002* (2013.01); *H04W 74/08* (2013.01); *H04W 84/042* (2013.01)

(58) Field of Classification Search
  USPC .................................................. 370/329, 330
  See application file for complete search history.

(56) References Cited

U.S. PATENT DOCUMENTS

| | | |
|---|---|---|
| 2008/0181156 A1 | 7/2008 | Ecclesine |
| 2013/0142095 A1* | 6/2013 | Calcev ................. H04W 28/02 370/311 |
| 2014/0112234 A1* | 4/2014 | Wei ........................ H04J 11/003 370/312 |
| 2014/0153471 A1 | 6/2014 | Zhang et al. |
| 2015/0288427 A1* | 10/2015 | Wang ................ H04W 72/1273 370/329 |
| 2015/0373626 A1* | 12/2015 | Yi .......................... H04W 48/20 375/132 |

OTHER PUBLICATIONS

International Search Report and Written Opinion—PCT/US2016/044806—ISA/EPO—Nov. 10, 2016 (13 pages).

* cited by examiner

TECHNIQUES FOR JOINT TRANSMISSION IN UNLICENSED SPECTRUM

CROSS-REFERENCE TO RELATED APPLICATIONS

The present Application for Patent claims priority to U.S. Provisional Application No. 62/199,846 entitled "TECHNIQUES FOR JOINT TRANSMISSION IN UNLICENSED SPECTRUM" filed Jul. 31, 2015, which is assigned to the assignee hereof and hereby expressly incorporated by reference herein.

BACKGROUND

Aspects of this disclosure relate generally to telecommunications, and more particularly to techniques for joint transmission in unlicensed spectrum.

Long Term Evolution networks are expanding operation in unlicensed radio frequency (RF) bands for data offload. For example, using carrier aggregation features, LTE networks can operate at higher data rates while using both licensed and unlicensed RF bands. A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectively for communicating with one another.

Moreover, as LTE networks expand operation in unlicensed RF bands in order to focus on higher capacity and provide higher bitrates, a number of other requirements need to be fulfilled. For example, the LTE networks need to provide increased peak data rates, higher spectral efficiency, increased number of simultaneously active subscribers, and improved performance at cell edges. In order to improve performance at cell edges, Coordinated Multi-Point operation (CoMP) was introduced. In CoMP, a number of transmit points provide coordinated transmission in the downlink, and a number of receive points provide coordinated reception in the uplink. In the case of downlink, data is available for transmission from two transmitting network entities or transmit points (e.g., two access points or base stations, also referred to as cells or nodes). When two or more network entities transmit on the same frequency and in the same subframe the transmission may be referred to as a "joint transmission." A joint transmission can be broadly described as a simultaneous or concurrent transmission of data to a user equipment or UE (also referred to as a wireless device, wireless terminal device, wireless terminal, or mobile device) from multiple cooperating access points.

Similarly, multicast-broadcast single-frequency network (MBSFN) was introduced to further improve the efficiency of the enhanced Multimedia Broadcast Multicast Service (eMBMS) service, which can deliver services such as mobile TV using the LTE infrastructure. A network device may transmit the same data (identical data) to multiple UEs simultaneously. Furthermore, network devices configured in MBSFN mode may also engage in joint transmission on the downlink. For example, multiple network entities may transmit the identical data simultaneously so that device UE may receive the same data from multiple access points.

As such, and given the growing use of the unlicensed spectrum, techniques are needed to provide efficient and improved identification of the type of downlink transmissions from one or more network entities.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a present method for identifying joint transmissions in unlicensed spectrum is provided. The described aspects include receiving, at a user equipment (UE), a frame from one or more network entities over a contention-based medium, wherein the frame includes a preamble. The described aspects further include determining whether the frame corresponds to a unicast transmission or a joint transmission based on the preamble.

In another aspect, a present apparatus for identifying joint transmissions in unlicensed spectrum may include memory configured to store instructions, and one or more processors communicatively coupled with the memory, wherein the one or more processors and the memory are configured to receive, at a UE, a frame from one or more network entities over a contention-based medium, wherein the frame includes a preamble. The described aspects further determine whether the frame corresponds to a unicast transmission or a joint transmission based on the preamble.

In another aspect, a present computer-readable medium may store computer executable code for identifying joint transmissions in unlicensed spectrum. The described aspects include code for receiving, at UE, a frame from one or more network entities over a contention-based medium, wherein the frame includes a preamble. The described aspects further include code for determining whether the frame corresponds to a unicast transmission or a joint transmission based on the preamble.

In another aspect, a present apparatus for identifying joint transmissions in unlicensed spectrum may include means for receiving, at UE, a frame from one or more network entities over a contention-based medium, wherein the frame includes a preamble. The described aspects further include means for determining whether the frame corresponds to a unicast transmission or a joint transmission based on the preamble.

In accordance with another aspect, a present method for identifying joint transmissions in unlicensed spectrum is provided. The described aspects include determining, at a network entity, whether a frame corresponds to a unicast transmission or a joint transmission. The described aspects further include transmitting the frame with a preamble to a UE over a contention-based medium, the preamble being based on determining whether the frame corresponds to the unicast transmission or the joint transmission.

In another aspect, a present apparatus for identifying joint transmissions in unlicensed spectrum may include memory configured to store instructions, and one or more processors communicatively coupled with the memory, wherein the one or more processors and the memory are configured to determine, at a network entity, whether a frame corresponds to a unicast transmission or a joint transmission. The described aspects further include transmit the frame with a preamble to a UE over a contention-based medium, the preamble being based on determining whether the frame corresponds to the unicast transmission or the joint transmission.

In another aspect, a present computer-readable medium may store computer executable code for identifying joint transmissions in unlicensed spectrum. The described aspects include code for determining, at a network entity, whether a frame corresponds to a unicast transmission or a joint transmission. The described aspects further include code for transmitting the frame with a preamble to a UE over a contention-based medium, the preamble being based on determining whether the frame corresponds to the unicast transmission or the joint transmission.

In another aspect, a present apparatus for identifying joint transmissions in unlicensed spectrum may include means for determining, at a network entity, whether a frame corresponds to a unicast transmission or a joint transmission. The described aspects further include means for transmitting the frame with a preamble to a UE over a contention-based medium, the preamble being based on determining whether the frame corresponds to the unicast transmission or the joint transmission.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1:
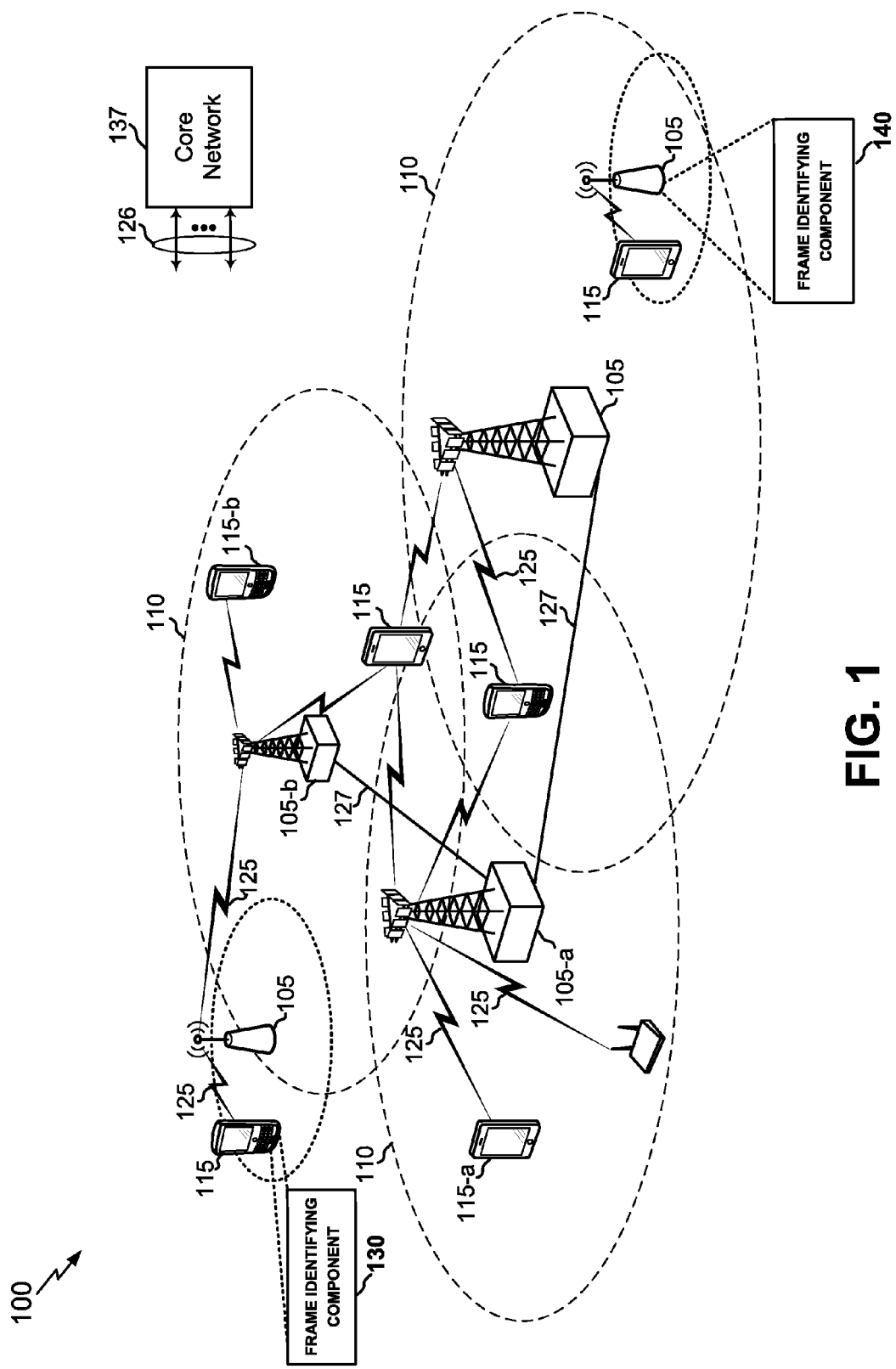
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to identifying joint transmissions in unlicensed spectrum during wireless communication. In particular, for example, preambles (e.g., channel usage beacon signals (CUBS) or a cell-specific reference signal (CRS), and/or physical frame format indicator channel (PFFICH) or a common PDCCH indicating the current frame format) may be used to indicate the start of a data transmission, and as such, a UE may be configured to search for preambles from a network entity acting as the serving cell. In an aspect, preamble detection is less power consuming than monitoring grants. Preambles may be configured in a manner in which the tone mapping is a function of public land mobile network (PLMN) identification (ID), and the sequence generation is a function of both PLMN ID and cell ID. Preambles with cell specific identifiers may be suitable for cell specific transmission (e.g., unicast transmissions), but they may not be able to exploit the gain with joint transmissions such as CoMP and/or MBSFN. Even if multiple cells transmit the same data, their corresponding preambles may suffer from other cell interference and therefore cannot benefit from joint transmission gains. For unicast transmissions (e.g., cell specific transmission) the UE may readily search for the preamble transmitted by the serving cell since the cell ID specific sequence of the serving cell is made previously available to the UE through cell acquisition. However, a UE may not be able to search for preambles corresponding to joint transmissions because the preambles are scrambled with additional identifiers and each frame in which the preambles are transmitted in are dedicated with a specific transmission type (e.g., unicast, CoMP, or MBSFN). Therefore, in certain aspects, a UE operating in unicast mode may be unable to search for preambles corresponding to joint transmissions.

Accordingly, in some aspects, the present methods and apparatuses may provide an efficient solution, as compared to current solutions, by identifying joint transmissions in unlicensed spectrum during wireless communication. In other words, in the present aspects, a UE may determine whether a transmission corresponds to a unicast transmission or a joint transmission. As such, the present aspects provide one or more mechanisms for receiving, at a UE, a frame from one or more network entities over a contention-based medium, wherein the frame includes a preamble, and determining whether the frame corresponds to a unicast transmission or a joint transmission based on the preamble (e.g., based on the preamble scrambling). Moreover, the present aspects also provide one or more mechanisms for determining, at a network entity, whether a frame corresponds to a unicast transmission or a joint transmission, and transmitting the frame with a preamble to a UE over a contention-based medium, where the preamble (e.g., the preamble scrambling and/or tone mapping) is based on determining whether the frame corresponds to the unicast transmission or the joint transmission.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Referring first to FIG. 1, a diagram illustrates an example of a wireless communications system 100, in accordance with aspects described herein. The wireless communications system 100 includes a plurality of base stations (e.g., eNBs, WLAN access points, or other access points) 105, a number of user equipment (UEs) 115, and a core network 137. One or more UEs 115 may include a frame identifying component 130 (see e.g., FIG. 4A) configured to identify joint transmissions in unlicensed spectrum. Similarly, one or more base stations 105 may include a frame identifying component 140 (see e.g., FIG. 4B) configured to identify joint transmissions in unlicensed spectrum. In an aspect, the frame identifying components 130/140 may search for preambles corresponding to joint transmissions even when a UE, such as UEs 115 are operating in unicast mode. The preambles are scrambled with additional identifiers and each frame in which the preambles are transmitted in are dedicated with a specific transmission type (e.g., unicast, CoMP, or MBSFN).

Accordingly, for example, the UEs 115 may communicate with one another (e.g., with or without the assistance of a base station 105 to schedule resources) using a direct message-based communication. Some of the base stations 105 may communicate with the UEs 115 under the control of a base station controller (not shown), which may be part of the core network 137 or the certain base stations 105 (e.g., eNBs) in various examples. Base stations 105 may communicate control information and/or user data with the core network 137 through backhaul links 126. In examples, the base stations 105 may communicate, either directly or indirectly, with each other over backhaul links 127, which may be wired or wireless communication links. The wireless communications system 100 may support operation on multiple carriers (waveform signals of different frequencies). Multi-carrier transmitters can transmit modulated signals simultaneously on the multiple carriers. For example, each of communication links 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 sites may provide communication coverage for a respective coverage area 110. In some examples, base stations 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). The base stations 105 may also utilize different radio technologies, such as cellular and/or WLAN radio access technologies (RAT). The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In LTE/LTE-Advanced (LTE-A), for example, the terms evolved Node B (eNodeB or eNB) may be generally used to describe the base stations 105. The wireless communications system 100 may be a Heterogeneous LTE/LTE-A network in which different types of access points provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 137 may communicate with the eNBs or other base stations 105 via a backhaul links 126 (e.g., S1 interface, etc.). The base stations 105 may also communicate with one another, e.g., directly or indirectly via backhaul links 127 (e.g., X2 interface, etc.) and/or via backhaul links 126 (e.g., through core network 137). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, a vehicle-based UE, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The UEs 115 may be configured to collaboratively communicate with multiple base stations 105 through, for example, Multiple Input Multiple Output (MIMO), carrier aggregation (CA), Coordinated Multi-Point (CoMP), multiple connectivity, or other schemes. MIMO techniques use multiple antennas on the base stations 105 and/or multiple antennas on the UEs 115 to transmit multiple data streams.

Figure 2:
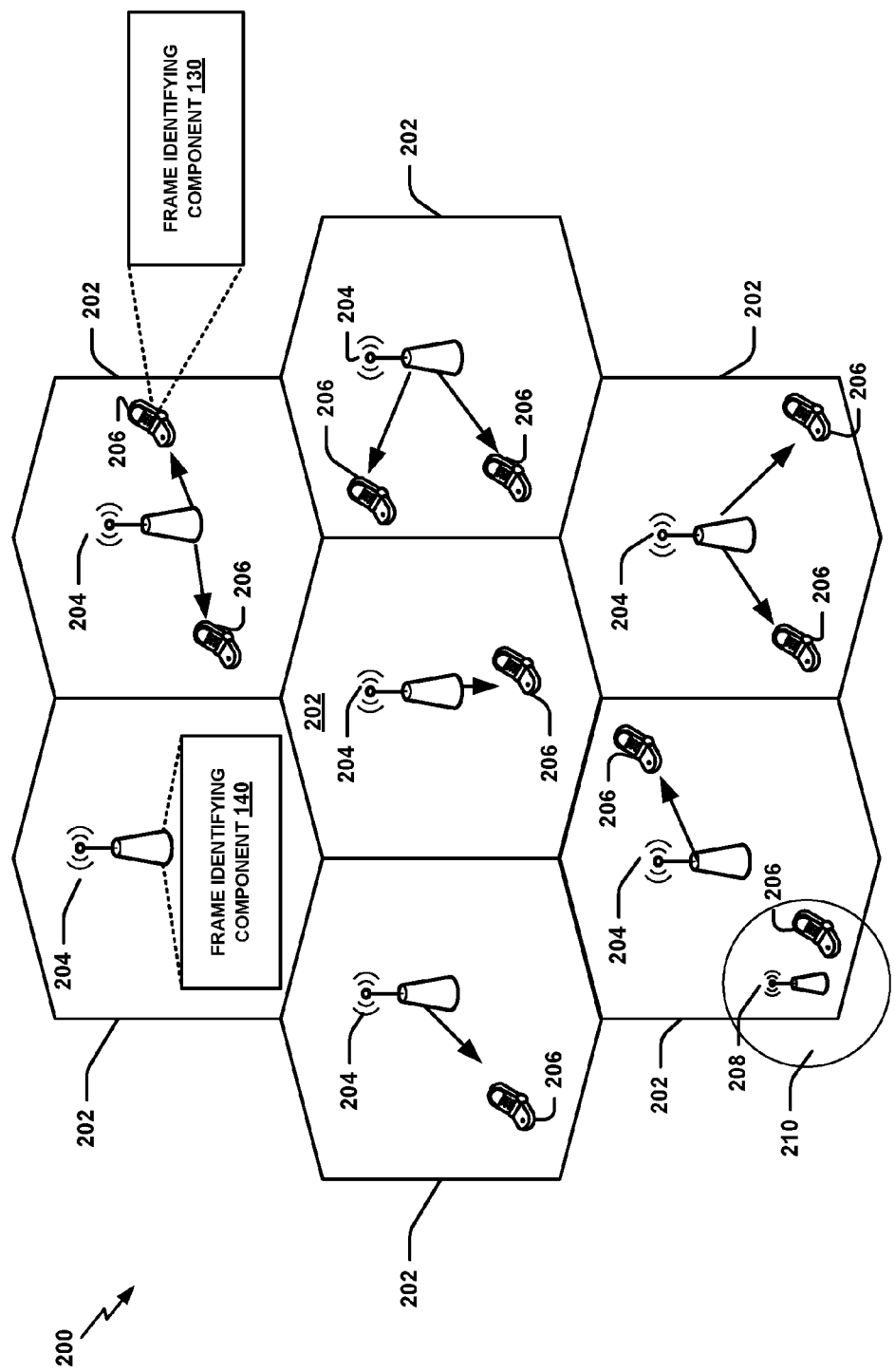
FIG. 2 is a diagram illustrating an example of an access network.

FIG. 2 is a diagram illustrating an example of an access network 200 in an LTE network architecture or similar cellular network architecture. In this example, the access network 200 is divided into a number of cellular regions (cells) 202. One or more lower power class base stations 208 may have cellular regions 210 that overlap with one or more of the cells 202. The lower power class base stations 208 may be a femto cell (e.g., home eNB (HeNB)), pico cell, micro cell, or remote radio head (RRH). The macro base stations 204 are each assigned to a respective cell 202 and are configured to provide an access point to the core network 137 for all the UEs 206 in the cells 202.

In an aspect, one or more UEs 206 may include a frame identifying component 130 (see e.g., FIG. 4A) configured to identify joint transmissions in unlicensed spectrum. Similarly, one or more base stations 204/208 may include a frame identifying component 140 (see e.g., FIG. 4B) configured to identify joint transmissions in unlicensed spectrum. There is no centralized controller in this example of an access network 200, but a centralized controller may be used in alternative configurations. The base stations 204 are responsible for all radio related functions including radio bearer control, admission control, mobility control, scheduling, security, and connectivity to one or more components of core network 137.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The base stations 204 may have multiple antennas supporting MIMO technology. The use of MIMO technology enables the base stations 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the base stations 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
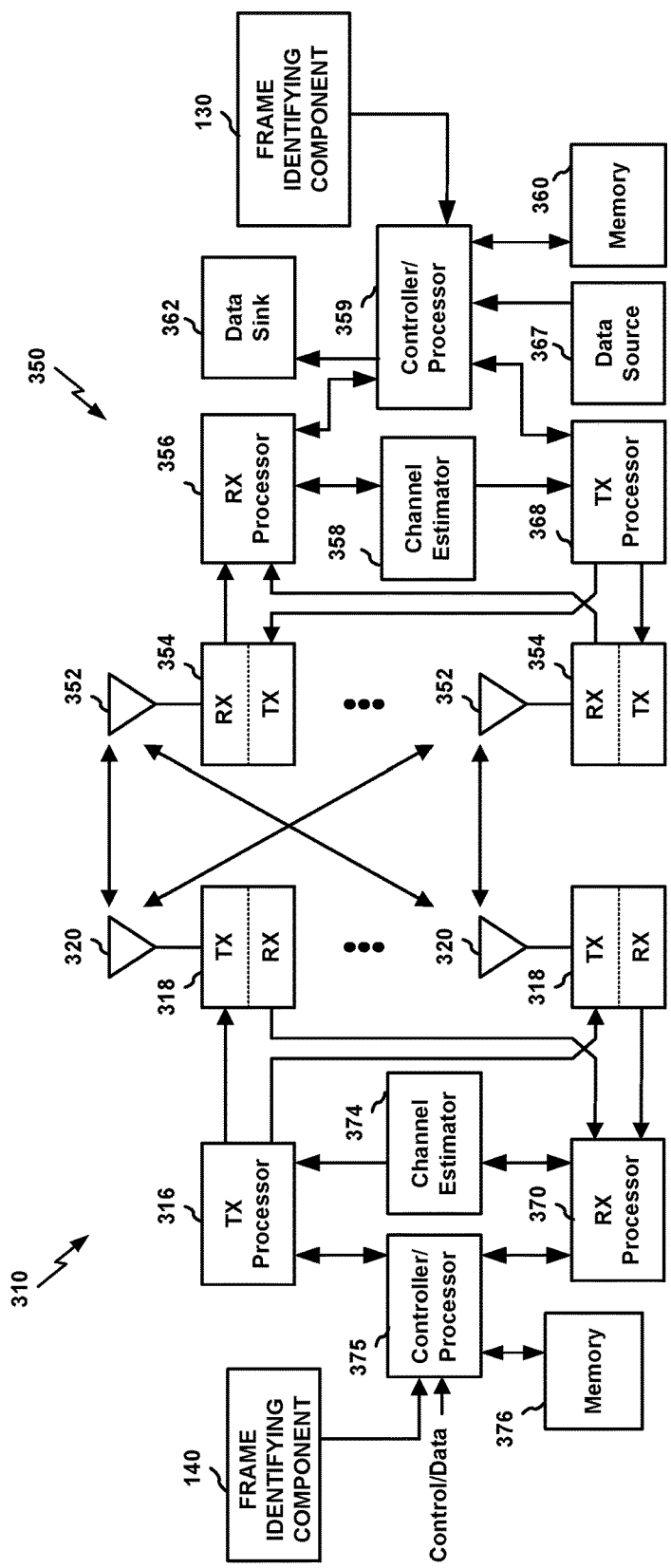
FIG. 3 is a diagram illustrating an example of an evolved Node B and user equipment in an access network.

FIG. 3 is a block diagram of a base station 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, base station 310 may include a frame identifying component 140 (see e.g., FIG. 4B) configured to identify joint transmissions in unlicensed spectrum. Though frame identifying component 140 is shown as coupled to controller/processor 375, it is to be appreciated that frame identifying component 140 can also be coupled to other processors (e.g., RX processor 370, TX processor 316, etc.) and/or implemented by the one or more processors 316, 370, 375 to perform actions described herein. Furthermore, for example, frame identifying component 140 may be implemented by any one or more of the processors including, but not limited to, processors 316, 370, and/or 375. Similarly, frame identifying component 130 may be implemented by any one or more of the processors including, but not limited to, processors 356, 359, and/or 368.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a frame identifying component 130 (see e.g., FIG. 4A) configured to identify joint transmissions in unlicensed spectrum. Though frame identifying component 130 is shown as coupled to controller/processor 359, it is to be appreciated that communicating component 461 can also be coupled to other processors (e.g., RX processor 356, TX processor 368, etc.) and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the base station 310, the controller/processor 359 implements the L2 layer for the user plane and the control plane by providing header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4A:
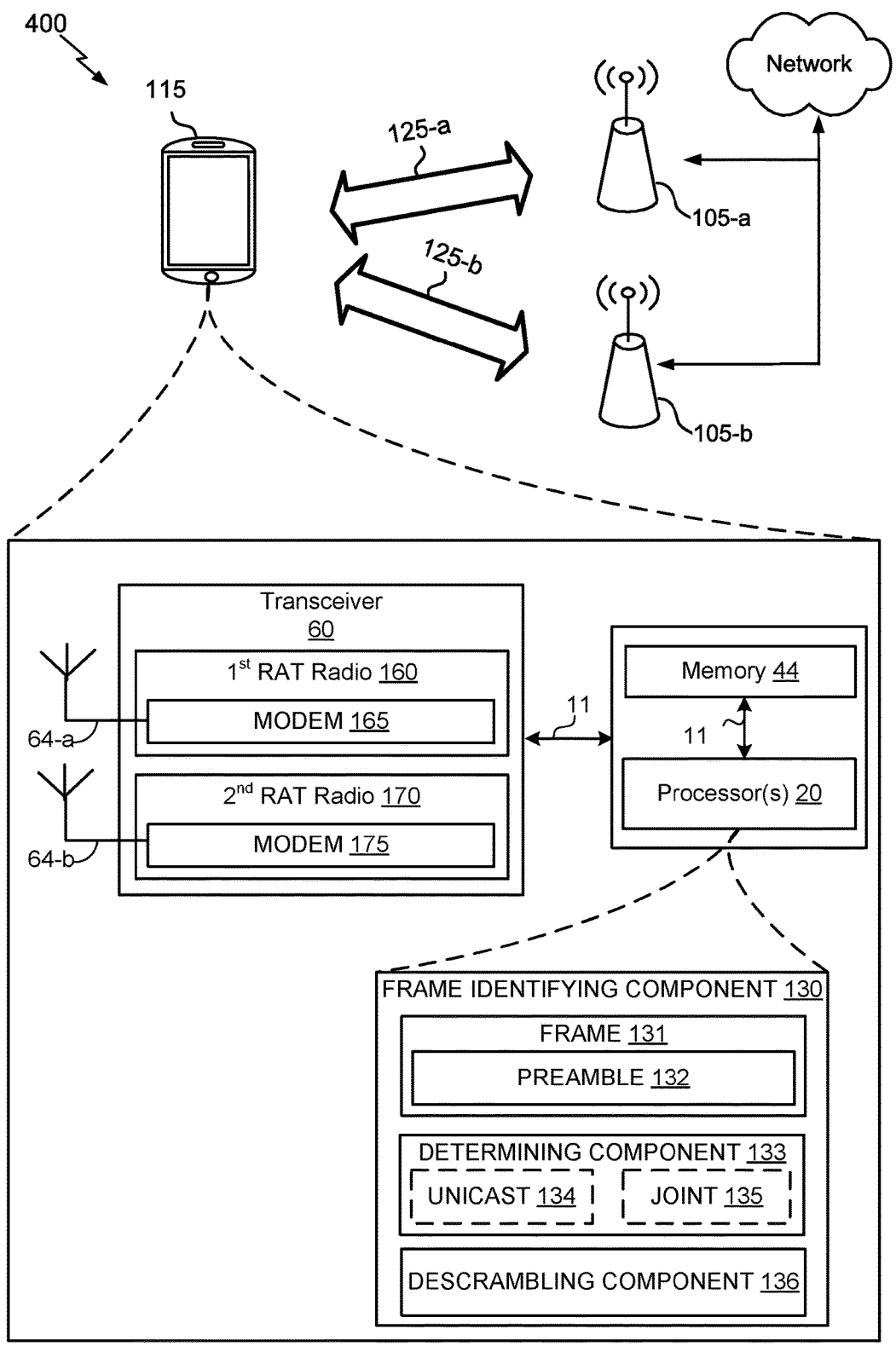
FIGS. 4A and 4B are simplified block diagrams of several sample aspects of a communication system in accordance with various aspects of the present disclosure.
Figure 4B:
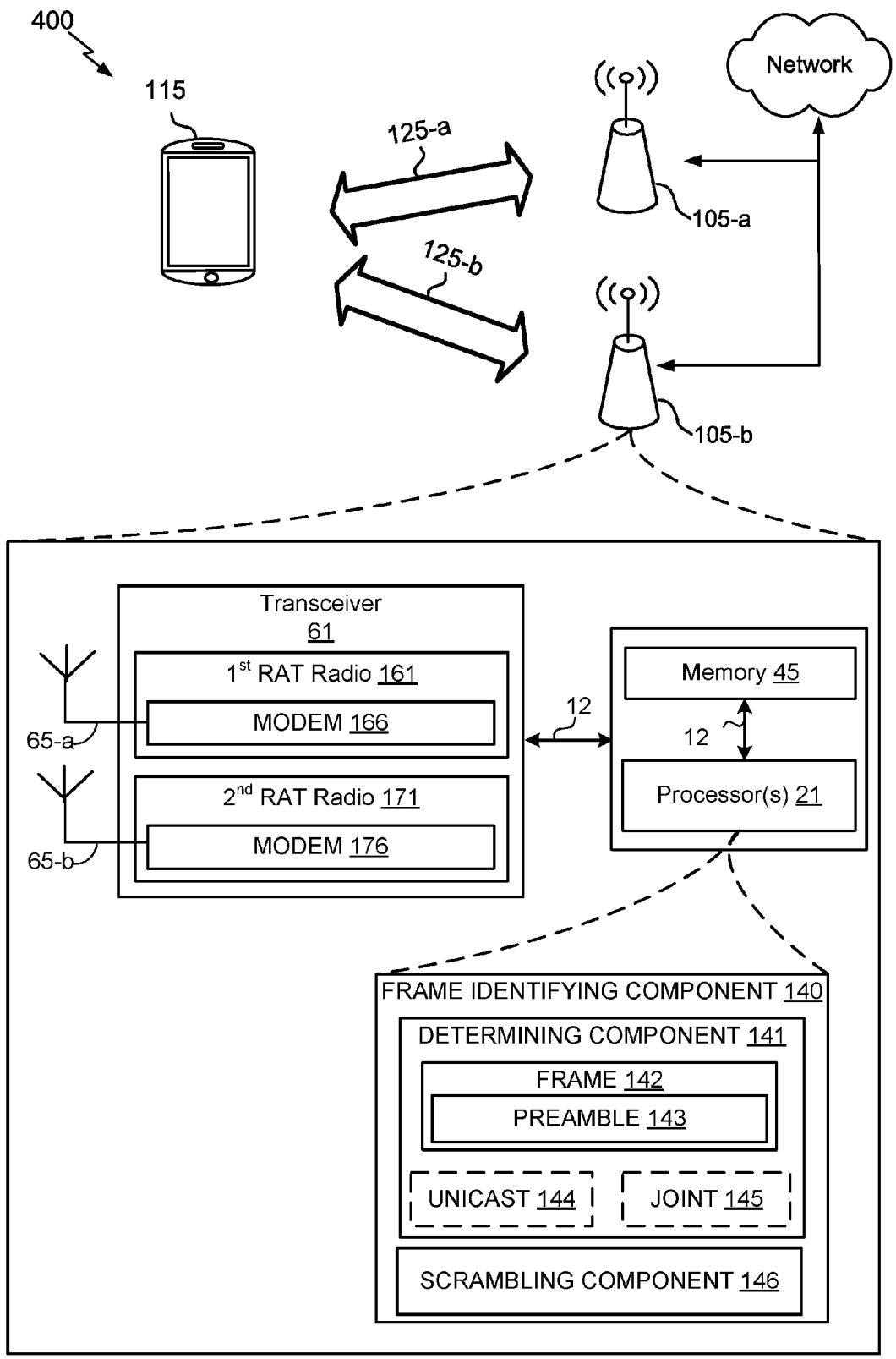

Referring to FIG. 4A and FIG. 4B, in an aspect, a wireless communication system 400 includes at least one UE 115, similar to UE 115 (FIG. 1), UE 206 (FIG. 2), and/or UE 350 (FIG. 3), in communication coverage of at least network entities 105-a and 105-b. The UE 115 may communicate with network via network entity 105-b and/or network entity 105-a. In an example, UE 115 may transmit and/or receive wireless communication to and/or from network entities 105-a, 105-b via one or more communication channels 125-a, 125-b, which may include an uplink communication channel (or simply uplink channel) and a downlink communication channel (or simply downlink channel), such as but not limited to an uplink data channel and/or downlink data channel. Such wireless communications may include, but are not limited to, data, audio and/or video information.

Referring to FIG. 4A, in accordance with the present disclosure, UE 115 may include a memory 44, one or more processors 20 and a transceiver 60. The memory, one or more processors 20 and the transceiver 60 may communicate internally via a bus 11. In some examples, the memory 44 and the one or more processors 20 may be part of the same hardware component (e.g., may be part of a same board, module, or integrated circuit). Alternatively, the memory 44 and the one or more processors 20 may be separate components that may act in conjunction with one another. In some aspects, the bus 11 may be a communication system that transfers data between multiple components and subcomponents of the UE 115. In some examples, the one or more processors 20 may include any one or combination of modem processor, baseband processor, digital signal processor and/or transmit processor. Additionally or alternatively, the one or more processors 20 may include a frame identifying component 130 for carrying out one or more methods or procedures described herein. The frame identifying component 130 may comprise hardware, firmware, and/or software and may be configured to execute code or perform instructions stored in a memory (e.g., a computer-readable storage medium).

In some examples, the UE 115 may include the memory 44, such as for storing data used herein and/or local versions of applications or communication with frame identifying component 130 and/or one or more of its subcomponents being executed by the one or more processors 20. Memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, memory 44 may be a computer-readable storage medium (e.g., a non-transitory medium) that stores one or more computer-executable codes defining frame identifying component 130 and/or one or more of its subcomponents, and/or data associated therewith, when UE 115 is operating processor 20 to execute frame identifying component 130 and/or one or more of its subcomponents. In some examples, the UE 115 may further include a transceiver 60 for transmitting and/or receiving one or more data and control signals to/from the network via network entity 105-a and/or 105-b. The transceiver 60 may comprise hardware, firmware, and/or software and may be configured to execute code or perform instructions stored in a memory (e.g., a computer-readable storage medium). The transceiver 60 may include a $1^{st}$ RAT radio 160 comprising a modem 165, and a $2^{nd}$ RAT radio 170 (e.g., LTE radio) comprising a modem 175. The $1^{st}$ RAT radio 160 and $2^{nd}$ RAT radio 170 may utilize one or more antennas 64 for transmitting signals to and receiving signals from the network entity 105-a and/or 105-b. In an example, $1^{st}$ RAT radio 160 may be associated with a wireless local area network (WLAN) and $2^{nd}$ RAT radio 170 may be associated with a wireless wide area network (WWAN) over unlicensed spectrum.

When the UE 115 (or any other devices in the system 400) uses a first RAT to communicate on a given resource, this communication may be subjected to interference from nearby devices that use a second RAT to communicate on that resource. For example, communication by the UE 115 via LTE using second RAT radio 170 on a particular unlicensed RF band may be subject to interference from Wi-Fi devices operating on that band. For convenience, LTE on an unlicensed RF band may be referred to herein as LTE/LTE Advanced in unlicensed spectrum, or simply LTE in the surrounding context.

When network entity 105-b (and/or network entity 105-a) sends downlink transmissions to UE 115, assigned resources on the downlink frequency band are utilized. For example, the network entity 105-b operating in an unlicensed RF band may be assigned an interlace of RBs in which downlink data transmissions may be sent. In order to avoid collisions with other access points in a contention based downlink channel, the network entity 105-b may send a preamble. For convenience, LTE on an unlicensed RF band may be referred to herein as LTE/LTE Advanced in unlicensed spectrum, or simply LTE in the surrounding context. Moreover, LTE operating over an unlicensed spectrum may refer to the use or modification of LTE to operate in a contention-based communication system that uses a shared medium.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding UE (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

In a blended radio environment such as system 400, different RATs may make use of different channels at different times. Because different RATs are sharing the spectrum and operating partly independently of others, access to one channel may not imply access to another channel. Accordingly, a device capable of transmitting using multiple channels may need to determine whether each channel is available before transmitting. In order to increase bandwidth and throughput, it may be beneficial in some situations to wait for an additional channel to become available rather than transmitting using currently available channel(s).

Similarly, with regard to FIG. 4B, network entity 105-b may include a memory 45, one or more processors 21 and a transceiver 61. Memory 45, one or more processors 21 and a transceiver 61 may operate in the same and/or similar manner to memory 44, one or more processors 20 and a transceiver 60 of UE 115 described in FIG. 4A. Furthermore, memory 45, one or more processors 21 and a transceiver 61 may operate the same and/or similar components including, but not limited to a 1$^{st}$ RAT radio 161 with modem 166, a 2$^{nd}$ RAT radio 171 with modem 176, and antennas 65. Moreover, memory 45, one or more processors 21 and the transceiver 61 may communicate internally via a bus 12.

Referring back to FIG. 4A, as noted above, UE 115 may include the frame identifying component 130 for identifying joint transmissions in unlicensed spectrum from either or both network entity 105-a and/or 105-b. Identifying joint transmissions may involve identifying or distinguishing between unicast transmissions and joint transmissions, as well as identifying the type of joint transmission (e.g., CoMP or MBSFN transmission). Frame identifying component 130 may include hardware or means for identifying joint transmissions in unlicensed spectrum. Frame identifying component 130 may include a frame 131 which may include a preamble 132, and a determining component 133. The frame identifying component 130 and or a receiver (not shown) may be configured to receive a frame 131 from one or more access points (e.g., network entities 105-a and/or 105-b) over a contention-based spectrum, and the frame 131 includes a preamble 132. The determining component 133 may determine whether the frame 131 corresponds to a unicast transmission 134 or a joint transmission 135 based on the preamble 132, and if the frame is a joint transmission 135, which type of joint transmission is associated with the frame 131. For example, determining component 133 may determine whether the frame corresponds to a unicast transmission 134 or a joint transmission 135 based on the identifiers used to scramble preamble 132 and/or to obtain tone mapping for preamble 132. In an aspect, an UE 115 configured in unicast mode may execute descrambling component 136 to descramble preambles using the cell identifier (ID) and/or extract tone mapping for preambles using the cell ID. Further, UE 115 configured in CoMP mode may execute descrambling component 136 to descramble and/or extract tone mapping for preambles using the cell ID and a virtual cell identifier. Additionally, UE 115 configured in MBSFN mode may execute descrambling component 136 to descramble and/or extract tone mapping for preambles using the cell identifier and an MBSFN area identifier. As a result, a UE, such as UE 115, that is configured for unicast mode may reduce power consumption by search for preambles instead of monitoring for grants since it does not decode joint transmissions. Specifically, the UE 115 may search for preambles scrambled with a cell identifier which is less power consuming that monitoring for grants.

Furthermore, UE 115 may search for preambles scrambled with either virtual cell identifiers or MBSFN identifiers and trigger a sleep mode if the preambles are found. For example, if UE 115 is in CoMP mode but detects a preamble 132 with a MBSFN identifier, UE 115 may assume the frame is dedicated for MBSFN transmissions, and triggers sleep mode until the next frame is received. Similarly, if UE 115 is only monitoring MBSFN transmissions but is not configured in CoMP mode, and detects a preamble 132 with a virtual cell identifier that is not configured for MBSFN transmission, then UE 115 may trigger a sleep mode until the next frame is received. Therefore, UE 115 searches not only its own preamble 132 but also searches for preamble with other possible identifiers to determine what transmission type the frame will be dedicated to. UE 115 may receive the one or more identifiers (e.g., cell identifier, virtual cell identifier, and/or MBSFN identifier) via one or more system information blocks (SIBs) from a network entity or via the RRC configuration message, such as network entity 105-b. Moreover, the network entity 105-b and UE 115 may perform time division multiplexed (TDM) operations among the unicast transmission and joint transmission (e.g., CoMP or MBSFN) on the frame 131 (see e.g., FIG. 2).

Referring to FIG. 4B, network entity 105-b may include a frame identifying component 140 for identifying whether a frame to be transmitted corresponds to joint transmissions. Frame identifying component 140 may include hardware or means for identifying the transmission type for a frame (e.g., frame 142) to be transmitted over the unlicensed or shared spectrum (e.g., by accessing a contention-based medium). Frame identifying component 140 may include a determining component 141. The determining component 141 may include hardware or means for determining whether a frame 142 corresponds to a unicast transmission 144 or a joint transmission 145. In an aspect, scrambling component 146 may configure the preamble 143 with a cell identifier for a unicast transmission 144, a virtual cell identifier for a joint transmission 145 such as CoMP, or a MBSFN identifier for a joint transmission 145 such as MBSFN. Furthermore, frame identifying component 140 may include a transceiver 60 configured to transmit the frame 142 with a preamble 143 to UE 115 over a contention-based spectrum based on determining whether the frame 142 corresponds to the unicast transmission 144 or the joint transmission 145. Moreover, frame identifying component 140 may configure network entity 105-*b* to transmit one or more SIBs comprising one or more identifiers to any UEs served by the network entity 105-*b*. For example, network entity 105-*b* may signal virtual cell identifiers for unicast mode UEs so that unicast mode UEs may be configured to search for both preambles with cell identifiers and virtual cell identifiers in order to determine what transmission type a receive frame corresponds to.

Additionally, as used herein, the one or more wireless nodes, including, but not limited to, network entities 105-*a* and 105-*a* of wireless communication system 400, may include one or more of any type of network component, such as a network entity, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 400 may include one or more small cell base stations, such as, but not limited to a femtocell, picocell, microcell, or any other base station having a relatively small transmit power or relatively small coverage area as compared to a macro base station.

Figure 5:
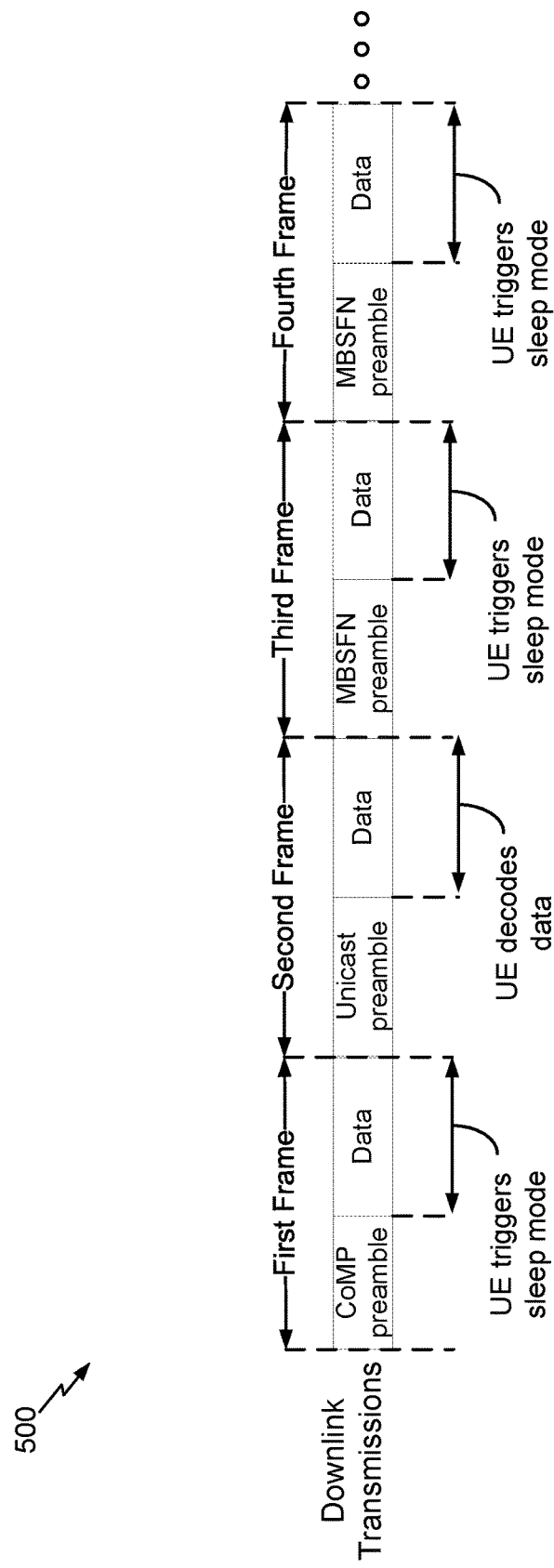
FIG. 5 is a diagram illustrating example frame structures for preamble transmission on a contention-based medium in accordance with various aspects of the present disclosure.

Referring to FIG. 5, is a diagram 500 illustrating an example downlink transmission by one or more network entities or nodes (e.g., network entity 105-*a* or network entity 105-*b*) engaged in joint transmission over an unlicensed or shared spectrum. In an aspect, diagram 500 illustrates a scenario where a first frame, a second frame, a third frame, and a fourth frame that are part of a sequence of frames are transmitted on an unlicensed or shared spectrum from a network entity (e.g., network entity 105-*b* of FIG. 4A) to a UE (e.g., UE 115 of FIG. 4A). For example, UE 115 may receive the first frame and execute frame identifying component 130 to determine whether the frame corresponds to a unicast transmission or a joint transmission based on the preamble. In this example, the first frame is identified with a CoMP preamble, so UE 115 determines that the first frame corresponds to a joint transmission. As such, a UE, such as UE 115, that is operating in unicast mode may trigger sleep mode for the remainder of the frame (and until the next frame is received) in order to save power since it does not process joint transmission data. Once UE 115 receives the second frame it may return to active mode and again determine whether the frame corresponds to a unicast transmission or a joint transmission based on the preamble. In this example, the second frame is identified with a unicast preamble, so UE 115 determines that the second frame corresponds to a unicast transmission. As such, the UE 115 will decode the remaining data received on the second frame. For the third and fourth frames, UE 115 will again determine whether the frame corresponds to a unicast transmission or a joint transmission based on the preamble. In this example, third and fourth frames are identified with a MBSFN preamble, so UE 115 determines that the third and fourth frames correspond to a joint transmission. As such, UE 115 may trigger sleep mode for the remainder of each frame (and until the next frame is received) in order to save power.

Figure 6:
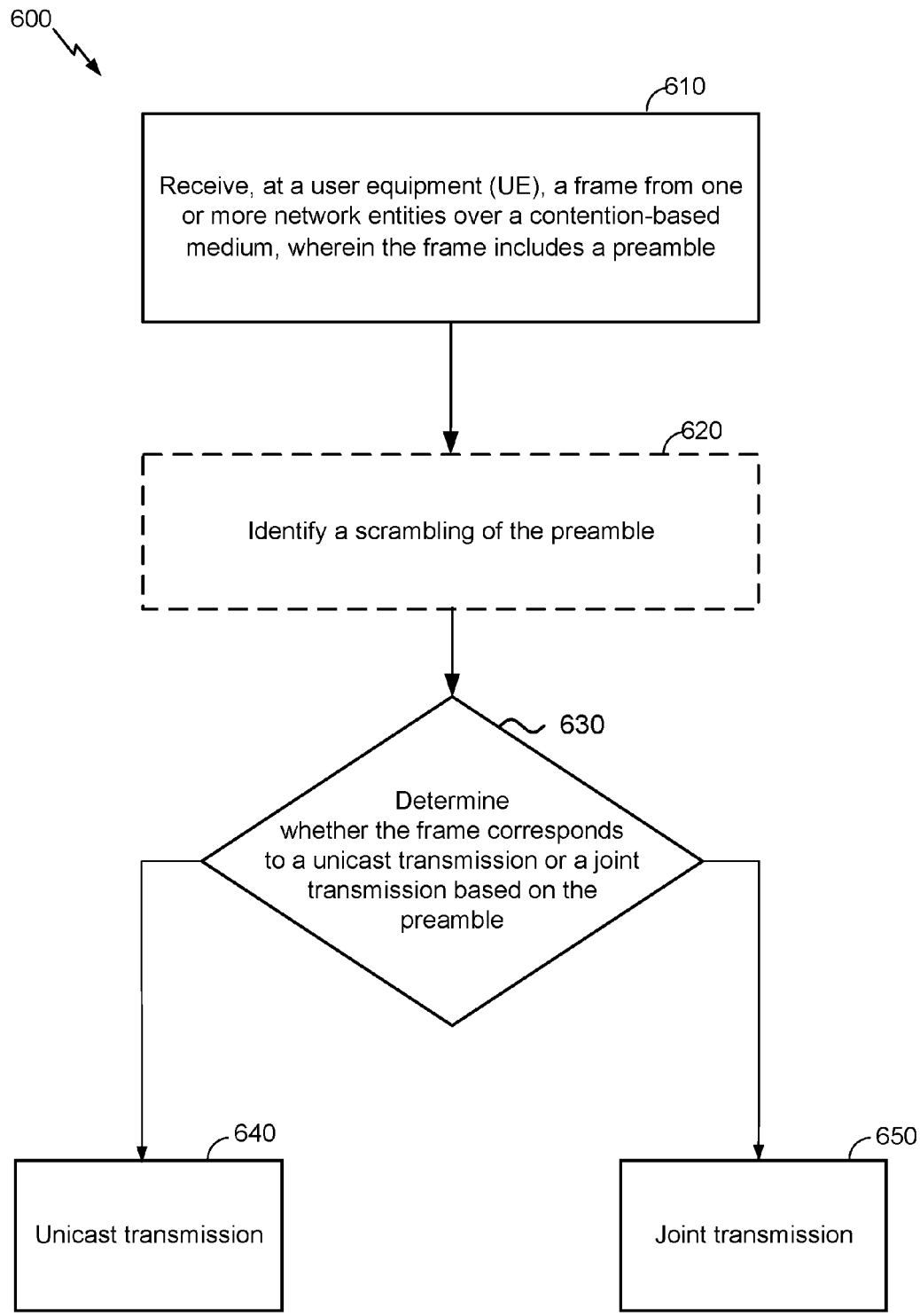
FIG. 6 is a flow diagram illustrating an example method of identifying joint transmissions in unlicensed spectrum during wireless communication in accordance with various aspects of the present disclosure.

Referring to FIG. 6, an example of one or more operations and/or an example of architectural layout and components and subcomponents (FIG. 4A) of an aspect of frame identifying component 130 (FIG. 4A) according to the present apparatus and methods are described with reference to one or more methods and one or more components that may perform the actions of these methods. Although the operations described below are presented in a particular order and/or as being performed by an example component, it should be understood that the ordering of the actions and the components performing the actions may be varied, depending on the implementation. Also, although the frame identifying component 130 is illustrated as having a number of subcomponents, it should be understood that one or more of the illustrated subcomponent may be separate from, but in communication with, the frame identifying component 130 and/or each other. Moreover, it should be understood that the following actions or components described with respect to the frame identifying component 130 and/or its subcomponents may be performed by a specially-programmed processor, a processor executing specially-programmed software or computer-readable media, or by any other combination of a hardware component and/or a software component specially configured for performing the described actions or components.

In an aspect, at block 610, method 600 includes receiving, at a UE, a frame from one or more network entities over a contention-based medium, wherein the frame includes a preamble. In an aspect, for example, UE 115, may execute frame identifying component 130 (FIG. 4A) and/or a transceiver 60 to receive a frame 131 from one or more network entities (network entity 105-*a* and/or 105-*b*) over a contention-based medium, wherein the frame 131 includes a preamble 132. Further, the preamble may comprise a channel usage beacon signal (CUBS) or a cell-specific reference signal (CRS). The preamble may also comprise a physical frame format indicator channel (PFFICH) or a common PDCCH indicating the current frame format. In a further aspect, processing system 1114 (FIG. 11), processor 1104, and/or memory 1106 may execute reception component 1004, or may perform at least some of the functions of reception component 1004, to receive a frame 131 from one or more network entities over a contention-based medium.

In an aspect, at block 620, method 600 optionally includes identifying a scrambling of the preamble. In an aspect, for example, UE 115, may execute frame identifying component 130 (FIG. 4A) and/or descrambling component 136 to identify a scrambling of the preamble 132. For example, the preamble 132 may be scrambled by identifier associated with a specific transmission type such as a cell identifier, virtual cell identifier, or MBSFN identifier. In a further aspect, processing system 1114 (FIG. 11), processor 1104, and/or memory 1106 may execute frame identifying component 1020, or may perform at least some of the functions of frame identifying component 1020, to identify a scrambling of the preamble 132.

In an aspect, at block 630, method 600 includes determining whether the frame corresponds to a unicast transmission or a joint transmission based on the preamble. In an aspect, for example, UE 115, may execute frame identifying component 130 (FIG. 4A) and/or determining component 133 to determine whether the frame 131 corresponds to a unicast transmission 134 or a joint transmission 135 based on the preamble 132. For example, frame identifying component 130 and/or determining component 133 may determine whether the frame 131 corresponds to the unicast transmission 134 or joint transmission 135 based on the scrambling of the preamble 132. In an aspect, frame identifying component 130 and/or determining component 133 may determine that the frame 131 corresponds to the unicast transmission 134 in response to identifying that the preamble 132 is scrambled by a cell identifier. As such, method 600 may proceed to block 640. Moreover, frame identifying component 130 and/or determining component 133 may determine that the frame 131 corresponds to a joint transmission 135 associated with a CoMP transmission in response to identifying that the preamble 132 is scrambled by a virtual cell identifier. As such, method 600 may proceed to block 650. Similarly, frame identifying component 130 and/or determining component 133 may determine that the frame 131 corresponds to a joint transmission 135 associated with a MBSFN transmission in response to identifying that the preamble 132 is scrambled by an MBSFN identifier. Again, method 600 may proceed to block 650. In the instance that method 600 proceeds to block 650, UE 115 may be triggered to a sleep mode for a remainder of the frame 131 if the UE 115 was operating in a unicast mode. UE 115 may remain in the sleep mode until a next frame is received. Additionally, UE 115 and/or frame identifying component 130 may be configured to perform tone mapping of the PFFICH using a virtual cell identifier and a MBSFN identifier in response to identifying that the scheduling frame corresponds to the joint transmission 135 where joint PFFICH transmission across nodes further implies transmitting same PFFICH contents across nodes participating in joint transmission. In a further aspect, processing system 1114 (FIG. 11), processor 1104, and/or memory 1106 may execute frame identifying component 1020, or may perform at least some of the functions of frame identifying component 1020, to determine whether the frame 131 corresponds to a unicast transmission 134 or a joint transmission 135 based on the preamble 132.

Figure 7:
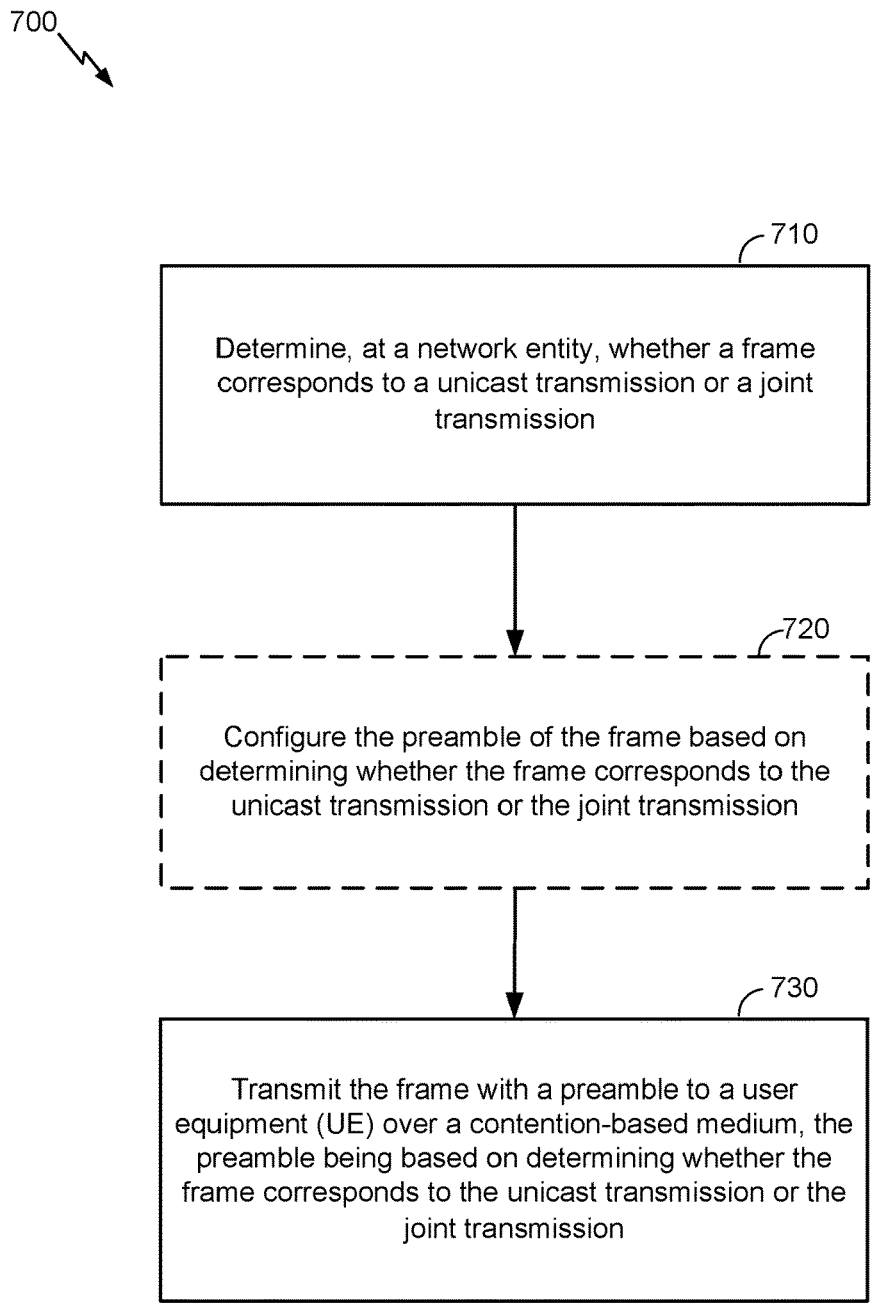
FIG. 7 is another flow diagram illustrating an example method of identifying joint transmissions in unlicensed spectrum during wireless communication in accordance with various aspects of the present disclosure.

Referring to FIG. 7, an example of one or more operations and/or an example of architectural layout and components and subcomponents (FIG. 4B) of an aspect of frame identifying component 140 (FIG. 4B) according to the present apparatus and methods are described with reference to one or more methods and one or more components that may perform the actions of these methods. Although the operations described below are presented in a particular order and/or as being performed by an example component, it should be understood that the ordering of the actions and the components performing the actions may be varied, depending on the implementation. Also, although the frame identifying component 140 is illustrated as having a number of subcomponents, it should be understood that one or more of the illustrated subcomponent may be separate from, but in communication with, the frame identifying component 140 and/or each other. Moreover, it should be understood that the following actions or components described with respect to the frame identifying component 140 and/or its subcomponents may be performed by a specially-programmed processor, a processor executing specially-programmed software or computer-readable media, or by any other combination of a hardware component and/or a software component specially configured for performing the described actions or components.

In an aspect, at block 710, method 700 includes determining, at a network entity, whether a frame corresponds to a unicast transmission or a joint transmission. In an aspect, for example, network entity 105-b, may execute frame identifying component 140 (FIG. 4B) and/or determining component 141 to determine whether a frame 142 corresponds to a unicast transmission 144 or a joint transmission 145. For example, if the frame 142 corresponds to a joint transmission 145, it may correspond to a CoMP or MBSFN transmission. In a further aspect, processing system 914 (FIG. 9), processor 904, and/or memory 906 may execute frame identifying component 820, or may perform at least some of the functions of frame identifying component 820, to determine whether a frame 142 corresponds to a unicast transmission 144 or a joint transmission 145.

In an aspect, at block 720, method 700 optionally includes configuring the preamble of the frame based on determining whether the frame corresponds to the unicast transmission or the joint transmission. In an aspect, for example, network entity 105-b, may execute frame identifying component 140 (FIG. 4B) and/or determining component 141 to configure the preamble 143 of the frame 142 based on determining whether the frame 142 corresponds to the unicast transmission 144 or the joint transmission 145. For example, frame identifying component 140 and/or determining component 141 may configure the preamble 143 with a cell identifier if the frame 142 is determined to correspond to a unicast transmission 144. Moreover, frame identifying component 140 and/or determining component 141 may configure the preamble 143 with a virtual cell identifier if the frame 142 is determined to correspond to a joint transmission 145 such as CoMP. Similarly, frame identifying component 140 and/or determining component 141 may configure the preamble 143 with a MBSFN identifier if the frame 142 is determined to correspond to a joint transmission 145 such as MBSFN. In a further aspect, processing system 914 (FIG. 9), processor 904, and/or memory 906 may execute frame identifying component 820, or may perform at least some of the functions of frame identifying component 820, to configure the preamble 143 of the frame 142 based on determining whether the frame 142 corresponds to the unicast transmission 144 or the joint transmission 145.

Figure 8:
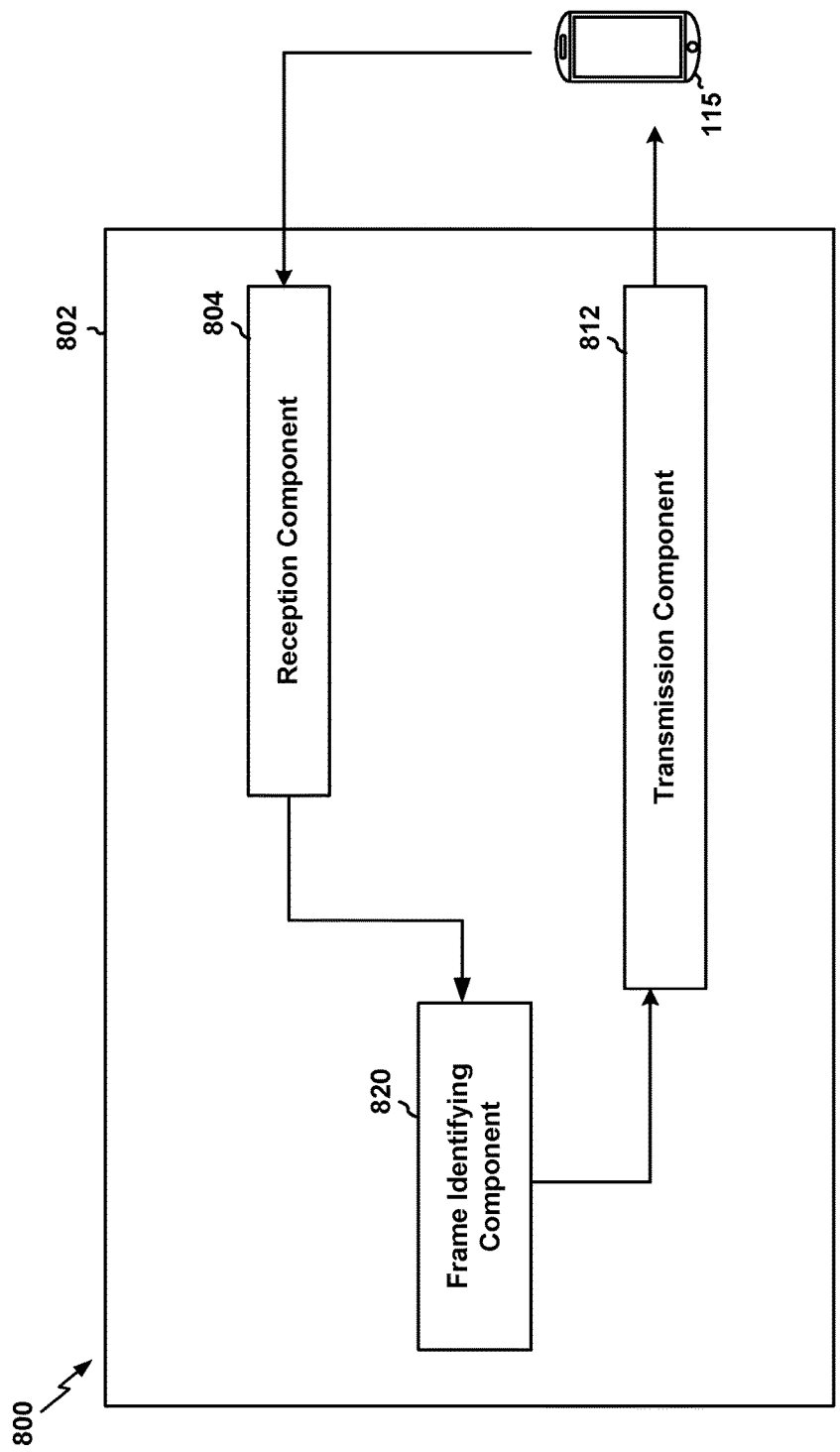
FIG. 8 is a conceptual data flow diagram illustrating the data flow between different means/components in an exemplary apparatus including a frame identifying component in accordance with various aspects of the present disclosure.

In an aspect, at block 730, method 700 includes transmitting the frame with the preamble to a UE over a contention-based medium, the preamble being based on determining whether the frame corresponds to the unicast transmission or the joint transmission. In an aspect, for example, network entity 105-b, may execute frame identifying component 140 (FIG. 4B) and/or a transceiver 61 to transmit the frame 142 with the preamble 143 to a UE (e.g., UE 115) over a contention-based medium, the preamble 143 being based on determining whether the frame 142 corresponds to the unicast transmission 144 or the joint transmission 145. In a further aspect, processing system 914 (FIG. 9), processor 904, and/or memory 906 may execute transmission component 812, or may perform at least some of the functions of transmission component 812, to transmit the frame 142 with the preamble 143 to a UE (e.g., UE 115) over a contention-based medium FIG. 8 is a conceptual data flow diagram 800 illustrating the data flow between different means/components in an exemplary apparatus 802 that includes frame identifying component 820, which may be the same as or similar to frame identifying component 140. The apparatus 802 may be a base station, which may include base station 105 of FIGS. 1 and 4B. The apparatus 802 includes frame identifying component 820 that, in an aspect, determines, at a network entity, whether a frame corresponds to a unicast transmission or a joint transmission. The apparatus 802 further includes a transmission component 812 that transmits the frame with a preamble to a UE, such as UE 115, over a contention-based medium, the preamble being based on determining whether the frame corresponds to the unicast transmission or the joint transmission. Further, apparatus 802 includes reception component 804 that receives one or more signals from at least one of the one or more UEs.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
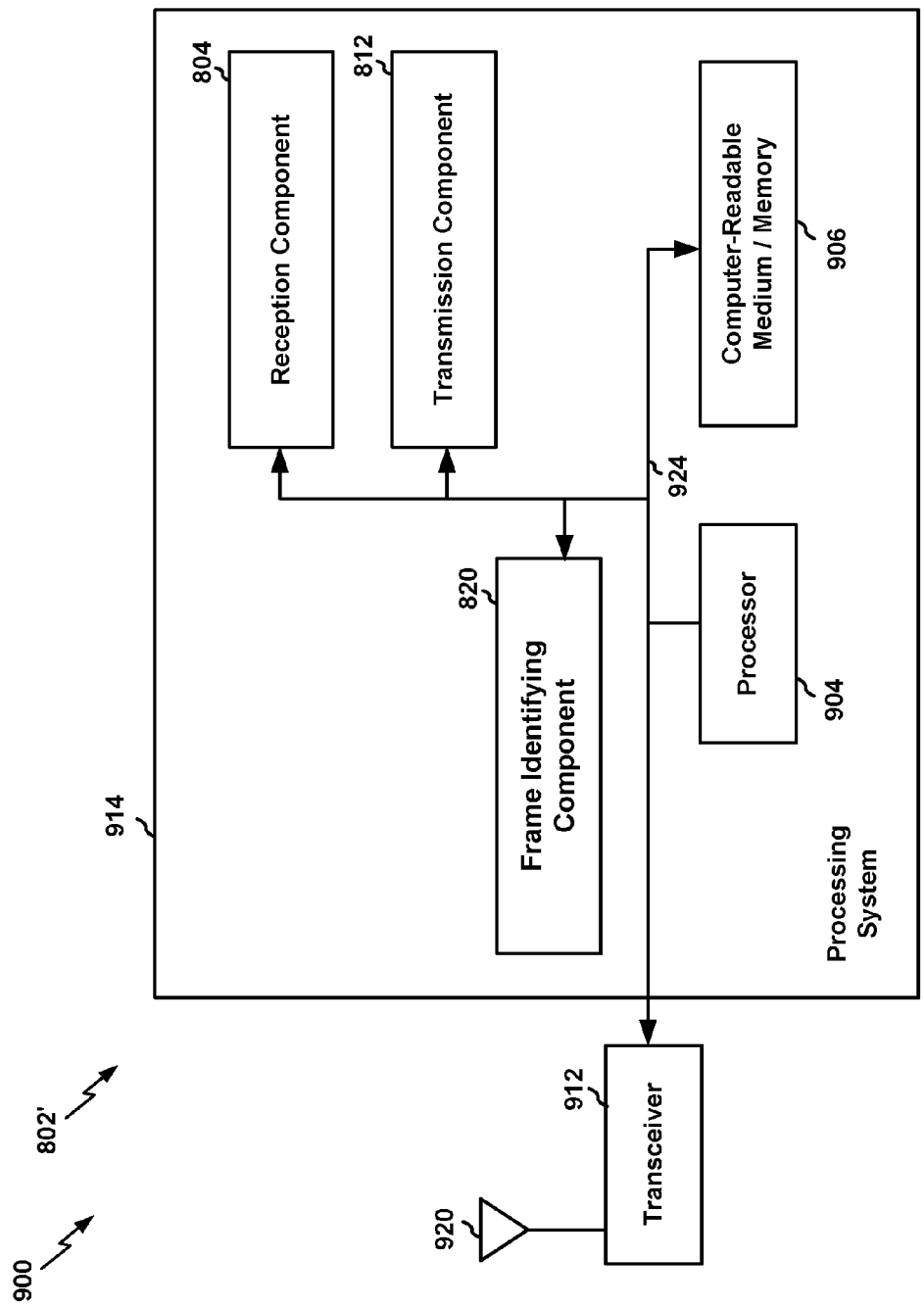
FIG. 9 is a diagram illustrating an example of a hardware implementation for an apparatus employing a processing system including a frame identifying component in accordance with various aspects of the present disclosure.

FIG. 9 is a diagram 900 illustrating an example of a hardware implementation for an apparatus 802' employing a processing system 914 that includes frame identifying component 820 (FIG. 8), which may be the same as or similar to frame identifying component 140 (FIG. 4B). The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, which may be the same as or similar to processor(s) 375 (FIG. 3) and/or 21 (FIG. 4B), the components 804, 812, and 820, and the computer-readable medium/memory 906, which may be the same as or similar to memory 376 (FIG. 3) and/or 45 (FIG. 4B). The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 812, and 820. The components may be software components running in the processor 904, resident/stored in the computer readable medium/memory 906, one or more hardware components coupled to the processor 904, or some combination thereof.

In one configuration, the apparatus 902/802' for wireless communication includes means for identifying joint transmissions in unlicensed spectrum. The apparatus includes means for determining, at a network entity, whether a frame corresponds to a unicast transmission or a joint transmission. Further, in another configuration, the apparatus 902/802' for wireless communication includes means for transmitting the frame with a preamble to a UE over a contention-based medium, the preamble being based on determining whether the frame corresponds to the unicast transmission or the joint transmission.

The aforementioned means may be one or more of the aforementioned components of the apparatus 902 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
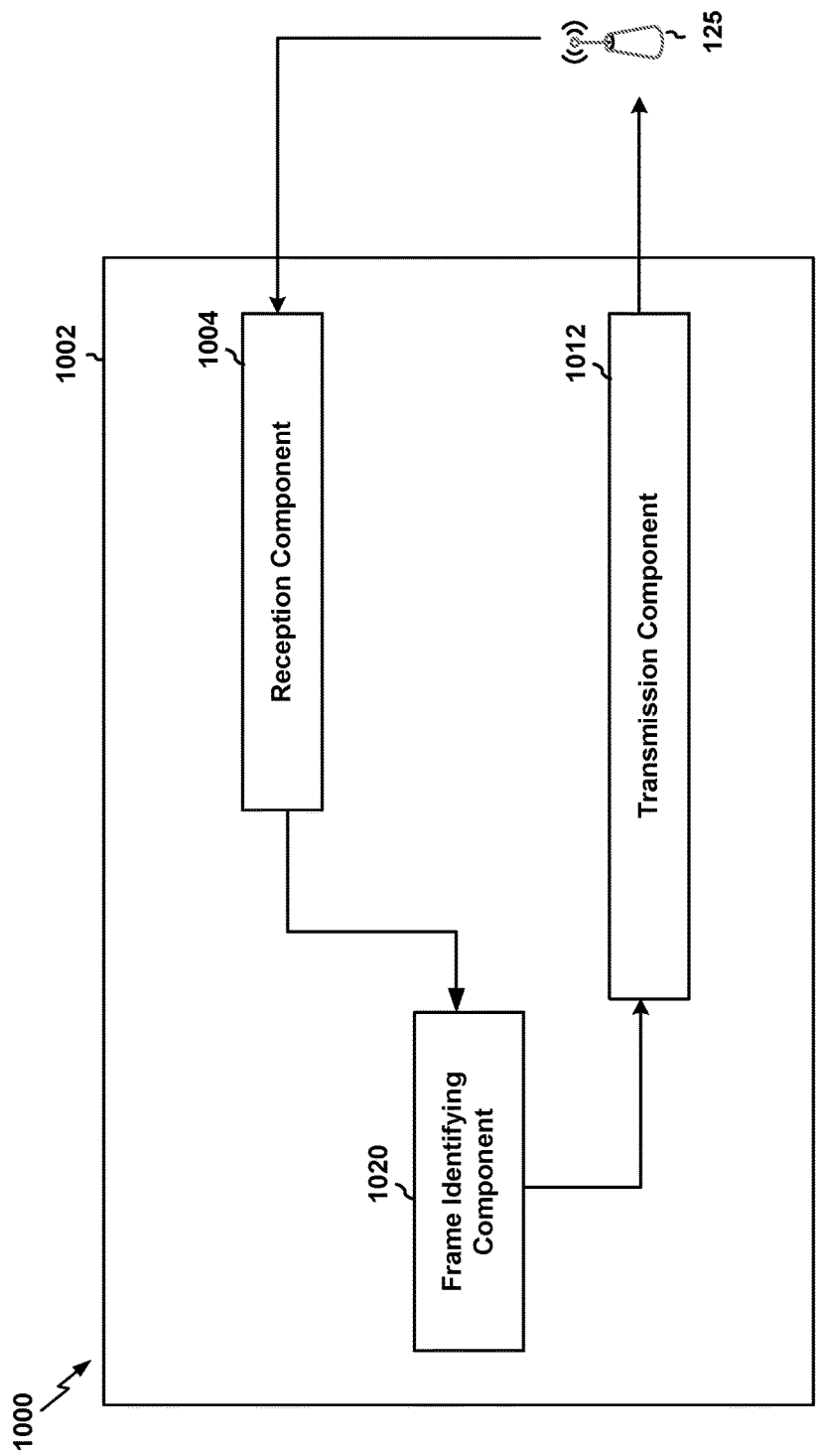
FIG. 10 is a conceptual data flow diagram illustrating the data flow between different means/components in an exemplary apparatus including a frame identifying component in accordance with various aspects of the present disclosure.

FIG. 10 is a conceptual data flow diagram 1000 illustrating the data flow between different means/components in an exemplary apparatus 1002 that includes frame identifying component 1020, which may be the same as or similar to frame identifying component 130. The apparatus 1002 may be a UE, which may include UE 115 of FIGS. 1 and 4A. The apparatus 1002 includes reception component 1004 that, in an aspect, receives, at a UE, a frame from one or more network entities over a contention-based medium, wherein the frame includes a preamble. The apparatus 1002 includes frame identifying component 1020 that determines whether the frame corresponds to a unicast transmission or a joint transmission based on the preamble. In an aspect, the apparatus 1002 further includes transmission component 1012 that transmits one or more signals to at least one of the one or more base stations.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
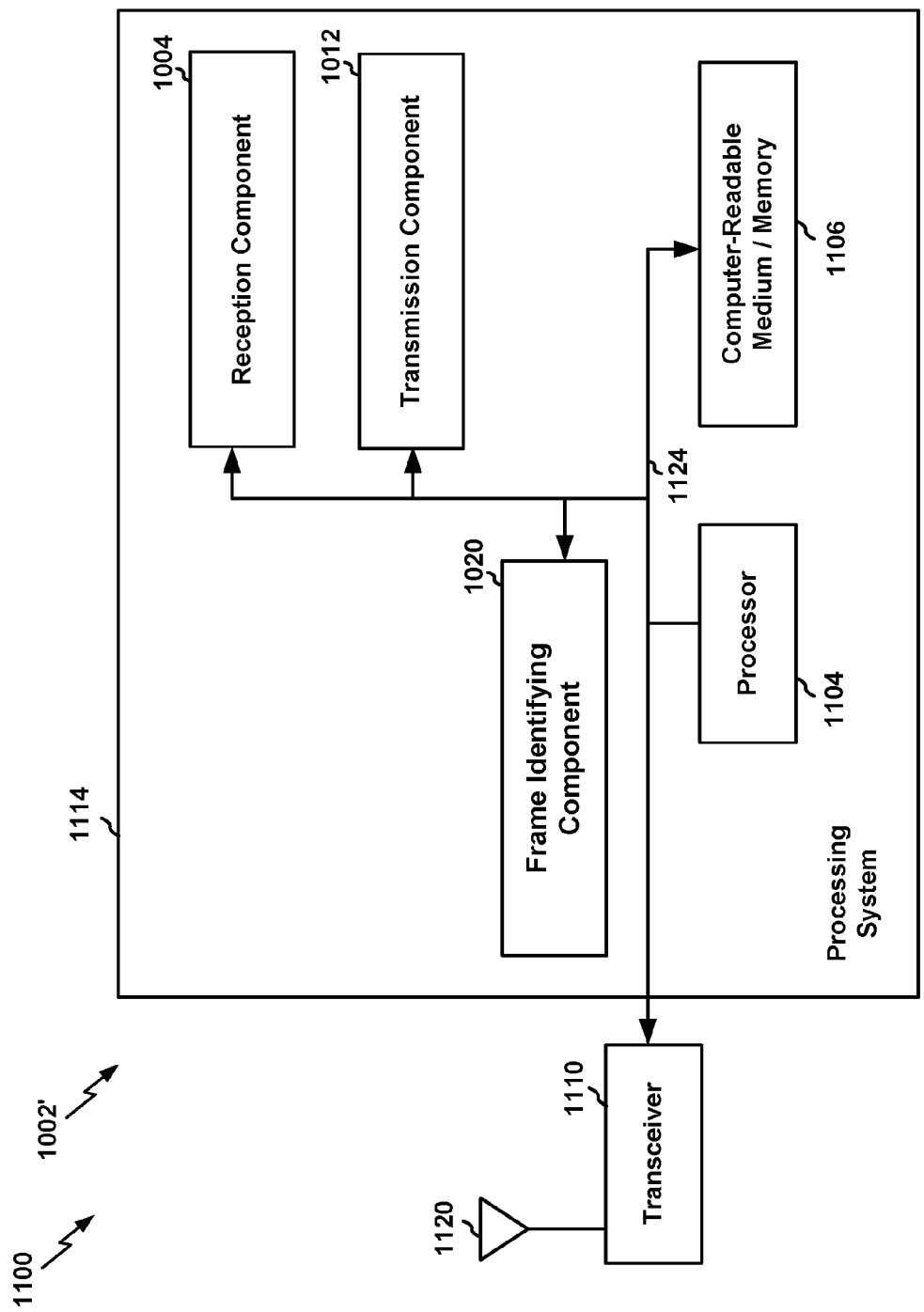
FIG. 11 is a diagram illustrating an example of a hardware implementation for an apparatus employing a processing system including a frame identifying component in accordance with various aspects of the present disclosure.

FIG. 11 is a diagram 1100 illustrating an example of a hardware implementation for an apparatus 1002' employing a processing system 1114 that includes frame identifying component 1020 (FIG. 10), which may be the same as or similar to frame identifying component 130 (FIG. 4A). The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, which may be the same as or similar to processor(s) 20 (FIG. 4A), the components 1004, 1010, and 1012, and the computer-readable medium/memory 1106, which may be the same as or similar to memory 44 (FIG. 4A). The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1112, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1010, and 1012. The components may be software components running in the processor 1104, resident/stored in the computer readable medium/memory 1106, one or more hardware components coupled to the processor 1104, or some combination thereof.

In one configuration, the apparatus 1102/1002' for wireless communication includes means for receiving, at a UE, a frame from one or more network entities over a contention-based medium, wherein the frame includes a preamble. The apparatus includes means for determining whether the frame corresponds to a unicast transmission or a joint transmission based on the preamble The aforementioned means may be one or more of the aforementioned components of the apparatus 1102 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communication, comprising:
receiving, at a user equipment (UE), a frame from one or more network entities over a contention-based medium, wherein the frame includes a preamble;
determining whether the frame corresponds to a unicast transmission or a joint transmission based on the preamble; and
triggering the UE to a sleep mode for a remainder of the frame in response to determining that the frame corresponds to the joint transmission and the UE being in a unicast mode, wherein the UE remains in the sleep mode until a next frame is received.

2. The method of claim 1, further comprising identifying a scrambling of the preamble, wherein determining whether the frame corresponds to the unicast transmission or the joint transmission is based on the scrambling of the preamble.

3. The method of claim 2, wherein determining whether the frame corresponds to the unicast transmission or the joint transmission comprises determining that the frame corresponds to the unicast transmission in response to identifying that the preamble is scrambled by a cell identifier.

4. The method of claim 2, wherein determining whether the frame corresponds to the unicast transmission or the joint transmission comprises determining that the frame corresponds to a joint transmission associated with a coordinated multi point (CoMP) transmission in response to identifying that the preamble is scrambled by a virtual cell identifier.

5. The method of claim 2, wherein determining whether the frame corresponds to the unicast transmission or the joint transmission comprises determining that the frame corresponds to a joint transmission associated with a multicast-broadcast single-frequency network (MBSFN) transmission in response to identifying that the preamble is scrambled by an MBSFN area identifier.

6. The method of claim 2, further comprising identifying a tone location of the preamble based on at least one or more of a cell identifier, a virtual cell identifier and a multicast-broadcast single-frequency network (MBSFN) area identifier.

7. The method of claim 1, wherein the preamble comprises a channel usage beacon signal (CUBS) or a cell-specific reference signal (CRS).

8. The method of claim 7, wherein the preamble further comprises a physical frame format indicator channel (PFFICH) or a common PDCCH indicating the current frame format.

9. The method of claim 8, further comprising performing tone mapping of the PFFICH or a common PDCCH indicating the current frame format using a virtual cell identifier and a multicast-broadcast single-frequency network (MBSFN) area identifier in response to identifying that a scheduling frame corresponds to the joint transmission.

10. The method of claim 9, further comprising performing the joint transmission of the PFFICH or a common PDCCH indicating the current frame format across the one or more network entities participating in the joint transmission.

11. The method of claim 1, wherein the contention-based medium is associated with an unlicensed or shared spectrum.

12. An apparatus for wireless communications, comprising:
a memory configured to store instructions, and
one or more processors communicatively coupled with the memory, wherein the one or more processors are configured to execute the instructions to:
receive, at a user equipment (UE), a frame from one or more network entities over a contention-based medium, wherein the frame includes a preamble,
determine whether the frame corresponds to a unicast transmission or a joint transmission based on the preamble; and
triggering the UE to a sleep mode for a remainder of the frame in response to determining that the frame corresponds to the joint transmission and the UE being in a unicast mode, wherein the UE remains in the sleep mode until a next frame is received.

13. The apparatus of claim 12, wherein the one or more processors are further configured to identify a scrambling of the preamble, wherein the one or more processors is configured to determine whether the frame corresponds to the unicast transmission or the joint transmission based on the scrambling of the preamble.

14. The apparatus of claim 13, wherein the one or more processors configured to determine whether the frame corresponds to the unicast transmission or the joint transmission are further configured to determine that the frame corresponds to the unicast transmission in response to identifying that the preamble is scrambled by a cell identifier.

15. The apparatus of claim 13, wherein the one or more processors configured to determine whether the frame corresponds to the unicast transmission or the joint transmission are further configured to determine that the frame corresponds to a joint transmission associated with a coordinated multi point (CoMP) transmission in response to identifying that the preamble is scrambled by a virtual cell identifier.

16. The apparatus of claim 13, wherein the one or more processors configured to determine whether the frame corresponds to the unicast transmission or the joint transmission are further configured to determine that the frame corresponds to a joint transmission associated with a multicast-broadcast single-frequency network (MBSFN) transmission in response to identifying that the preamble is scrambled by an MBSFN area identifier.

17. The apparatus of claim 13, wherein the one or more processors are further configured to identify a tone location of the preamble based on at least one or more of a cell identifier, a virtual cell identifier and a multicast-broadcast single-frequency network (MBSFN) area identifier.

18. The apparatus of claim 12, wherein the preamble comprises a channel usage beacon signal (CUBS) or a cell-specific reference signal (CRS).

19. The apparatus of claim 18, wherein the preamble further comprises a physical frame format indicator channel (PFFICH) or a common PDCCH indicating the current frame format.

20. The apparatus of claim 19, wherein the one or more processors are further configured to perform tone mapping of the PFFICH or a common PDCCH indicating the current frame format using a virtual cell identifier and a multicast-broadcast single-frequency network (MBSFN) area identifier in response to identifying that a scheduling frame corresponds to the joint transmission, and wherein the one or more processors are further configured to perform the joint transmission of the PFFICH or a common PDCCH indicating the current frame format across the one or more network entities participating in the joint transmission.

21. The apparatus of claim 12, further comprising a transceiver, wherein the receive, at the UE, the frame from the one or more network entities over the contention-based medium.

22. The apparatus of claim 12, wherein the contention-based medium is associated with an unlicensed or shared spectrum.

23. An apparatus for communication, comprising:
means for receiving, at a user equipment (UE), a frame from one or more network entities over a contention-based medium, wherein the frame includes a preamble;
means for determining whether the frame corresponds to a unicast transmission or a joint transmission based on the preamble; and
means for triggering the UE to a sleep mode for a remainder of the frame in response to determining that the frame corresponds to the joint transmission and the UE being in a unicast mode, wherein the UE remains in the sleep mode until a next frame is received.

24. The apparatus of claim 23, further comprising means for identifying a scrambling of the preamble, wherein the means for determining whether the frame corresponds to the unicast transmission or the joint transmission is based on the scrambling of the preamble.

25. A non-transitory computer-readable medium storing computer executable code for communication, comprising:
code for receiving, at a user equipment (UE), a frame from one or more network entities over a contention-based medium, wherein the frame includes a preamble;
code for determining whether the frame corresponds to a unicast transmission or a joint transmission based on the preamble; and
code for triggering the UE to a sleep mode for a remainder of the frame in response to determining that the frame corresponds to the joint transmission and the UE being in a unicast mode, wherein the UE remains in the sleep mode until a next frame is received.

26. The non-transitory computer-readable medium of claim 25, further comprising code for identifying a scrambling of the preamble, wherein the code for determining whether the frame corresponds to the unicast transmission or the joint transmission is based on the scrambling of the preamble.

* * * * *